Aug. 7, 1962 W. R. PERRY 3,048,729
CATHODE RAY SCREEN STRUCTURE
Filed Jan. 19, 1961
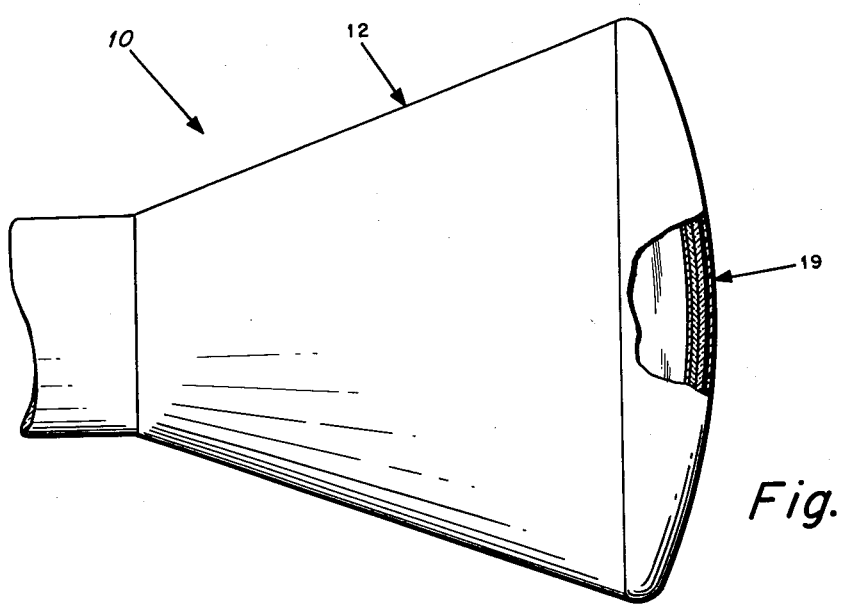
Fig. 1
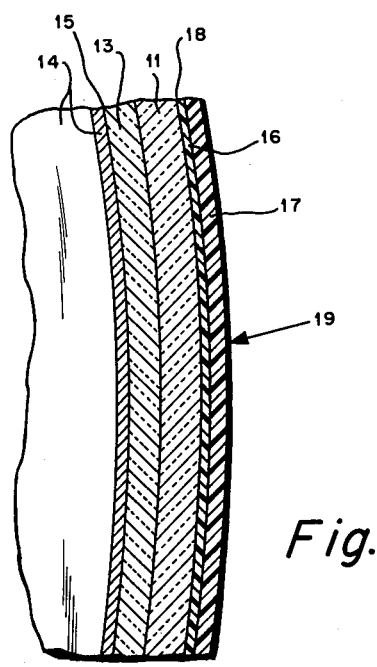
Fig. 2
INVENTOR.
WILLIAM R. PERRY
BY 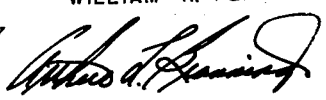
ATTORNEY United States Patent Office 3,048,729
Patented Aug. 7, 1962

3,048,729
CATHODE RAY SCREEN STRUCTURE
William R. Perry, 325 Warminster St., Hatboro, Pa.
Filed Jan. 19, 1961, Ser. No. 83,851
6 Claims. (Cl. 313—92)
(Granted under Title 35, U.S. Code (1952), sec. 266)

The invention herein described may be manufactured and used by or for the Government of the United States of America for governmental purposes without the payment of any royalties thereon or therefor.

This invention relates to cathode ray tube screens and more particularly to a particular screen structure for improving image contrast.

The contrast on the surface of a cathode ray viewing tube between that portion of the screen illuminated by ambient light only and that portion of the screen illuminated by ambient light plus electron bombardment is adversely affected by strong ambient light originating external to the cathode ray tube. This adverse effect on the contrast is generally known to be caused by the reflection of the ambient light off of the fluorescent material necessary in the construction of cathode ray screens. Various methods are employed to reduce this contrast destroying reflection of ambient light. Many of these methods employ combinations of light filters to prevent the reflected light from passing back through the screen. Another method for reducing reflection and thus increasing contrast uses a light absorbing material on the back of the fluorescent material.

This invention contemplates a particular screen structure which virtually eliminates ambient light reflection and thus vastly improves the contrast. This purpose is accomplished by the unique combination of a transparent fluorescent material or phosphor having a specularly reflecting surface with a particular filter arrangement. The transparent phosphor having a specular reflecting surface is necessary to insure that light reflecting from the surface maintains unaffected the polarization of incident light on the surface. In a conventional screen structure, even in one utilizing filters, where the fluorescent material is not transparent and is therefore light diffusing, it is not possible to accurately control the polarization of reflected light and thus some light due to reflection will always be visible.

Specifically, this invention contemplates a cathode ray tube screen which utilizes a transparent phosphor adjacent the internal face of the tube having a thin coating of metal such as aluminum thereon forming a specularly reflecting surface with the phosphor. On the external side of the tube face a polarizing filter and a quarter wavelength filter are arranged in side-by-side relationship with the polarizing filter being closer to the eye of an observer. Thus, light coming from an external source is polarized by the polarizer, translated forty-five degrees by the quarter wavelength filter, and is reflected from the specularly reflecting surface. Since it is specular reflection the forty-five degree translation of the light is maintained until it passes back through the quarter wavelength filter again where it is given an additional translation of forty-five degrees in the same direction so that the total translation of the light becomes ninety degrees with respect to the polarizing plane of the polarizing filter. The result, of course, is that the reflected light is not visible to the eye of an observer. Thus, it should be seen that the combination of the transparent phosphor having a specularly reflecting surface with the two filters is the basic idea behind this invention.

Therefore, it is an object of this invention to provide a cathode ray tube screen which greatly improves contrast by virtually eliminating reflected ambient light.

Another object of this invention is to provide a cathode ray tube structure for use in a radar screen or in a television viewing screen in which the contrast is virtually unaffected by the level of ambient illumination.

With these and other objects in view as will hereinafter more fully appear and which will be more particularly pointed out in the appended claims reference is now made to the following description taken in connection with the accompanying drawings in which:

FIG. 1 illustrates a cathode ray tube partially broken away to show the multi-layer screen structure.

FIG. 2 shows the screen structure of FIG. 1, magnified several times.

In FIG. 1 there is shown the general configuration of a cathode ray tube 10 in which reference numeral 11 indicates the face portion of the glass envelope 12. A transparent phosphor or fluorescent material is deposited on and forms a layer 13 on the internal portion of the face 11. The phosphor is of such a nature as to be transparent to visible light while at the same time to be fluorescent when bombarded with electrons from a conventional electron gun commonly used in cathode ray tubes. A thin metal coating 14 is deposited on the other side of the phosphor layer to form therewith a specularly reflecting surface 15. The coating of metal is thin enough to permit bombarding electrons to pass through. On the other side of the face 11 there is a quarter wavelength filter 16 optically bonded to the face 11 in any convenient manner. A polarizing filter 17 is bonded to the quarter wavelength filter and may form the external surface of the tube face. The polarizing filter and the quarter wavelength filter may be the combined plastic commercial product of the Polaroid Corporation.

The manner by which the screen structure 19 functions to reduce to a negligible amount the effect that external ambient light, no matter how intense, has on image contrast will now be discussed. Polarizing filter 17 passes external ambient light of one specific polarity. Quarter wavelength filter 16 then translates the polarized light an angle of 45 degrees. The light then reflects off specularly reflecting interface 15 and because it is a specularly reflecting interface, the reflected light has the same polarity as the incident light. The light then passes back through quarter wavelength filter 16 and is further translated another 45 degrees. The total change in polarity of the reflected light as it reaches polarizing filter 17 is at an angle of 90 degrees to the principal plane of the polarizer. In other words, the reflected light at interface 18 has been rotated in polarity 90 degrees relative to the incident light arriving at interface 18. Therefore, the reflected light is blocked by polarizer 17.

The face 11 of the envelope 12 may be placed on the external side of filter 17 instead of being interposed between the transparent phosphor and the filters. Also a nonreflective coating, as used on lenses in cameras, etc., may be added to the first surface of the polarizing filter to decrease reflections from the surface.

It should be clear from the above description that image contrast is greatly improved by the unique combination of a transparent phosphor having a specularly reflecting surface with a quarter wavelength filter and a polarizing filter. The transparent phosphor forming a specularly reflecting surface with a thin coating of optically opaque material is an essential part of the combination of the invention. If the filter arrangement described above were used with a conventional phosphor layer, that is one which diffuses light, it should be obvious that much of the reflected light would be changed in polarity upon reflection and thus the polarity of much of the light reaching the polarizer 17 would not be at a 90 degree angle to the plane of the polarizer and a substantial amount of the light would then be visible to an observer's eye.

It should be understood, of course, that the foregoing disclosure relates to only a preferred embodiment of the invention and that other modifications may be made therein without departing from the spirit and the scope of the invention as set forth in the appended claims.

What is claimed is:

1. A screen for a cathode ray tube, comprising: a non-light diffusing layer of fluorescent material having a specularly reflecting surface on one side thereof, a polarizing filter, a quarter wavelength filter, said quarter wavelength filter being interposed between said polarizing filter and the other side of said layer.

2. A screen for a cathode ray tube, comprising in combination: a layer of transparent phosphor having a specularly reflecting surface on one side thereof, a polarizing filter, a quarter wavelength filter, said quarter wavelength filter being interposed between said polarizing filter and the other side of said layer.

3. In a cathode ray tube having a face, a transparent phosphor layer optically bonded on the inner side of said face, a thin coating of metal on the inner side of said phosphor layer forming a specular reflecting interface therewith, a quarter wavelength filter optically bonded to the outer side of said face, a polarizing filter optically bonded to the outer side of said quarter wavelength filter.

4. A screen for a cathode ray tube, comprising in combination: a transparent phosphor layer having one side adjacent the internal surface of the tube face, a thin coating of metal on the other side of said layer forming a specularly reflecting interface therewith, a quarter wavelength filter, a polarizing filter, said quarter wavelength filter interposed between the external surface of the tube face and said polarizing filter.

5. In combination with a cathode ray tube having a tube face, a polarizing filter, a quarter wavelength filter, said quarter wavelength filter interposed between said polarizing filter and the external surface of the tube face, a layer of non-light diffusing fluorescent material optically bonded on one side to the internal surface of the tube face, a thin film of metal on the other side of said layer forming a specularly reflecting surface therewith.

6. In combination with a cathode ray tube, a polarizing filter forming the external portion of the screen of said tube, a quarter wavelength filter optically bonded on one side to said polarizing filter and on the other side to the glass envelope of said tube, a transparent phosphor layer optically bonded on one side to the internal side of the glass envelope of said tube, a thin metal coating on the other side of said phosphor layer forming a specularly reflecting surface with said phosphor layer whereby ambient light passing through said filters is specularly reflected and on reaching said polarizing filter is polarized ninety degrees to the principal plane of said polarizing filter and is unable to pass therethrough.

References Cited in the file of this patent

UNITED STATES PATENTS 2,958,801 Herriott Nov. 1, 1960